Figures 1, 2:
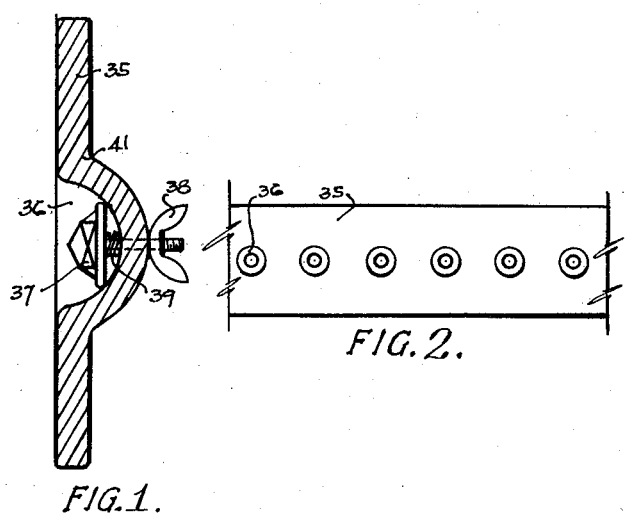

Dec. 8, 1936.　　　　S. SHAPERA　　　　2,063,763
AUTOMOBILE BUMPER
Filed Feb. 16, 1933

INVENTOR
SOLOMON SHAPERA
BY
ATTORNEY

Patented Dec. 8, 1936

2,063,763

UNITED STATES PATENT OFFICE

2,063,763
AUTOMOBILE BUMPER
Solomon Shapera, Mamaroneck, N. Y.

Application February 16, 1933, Serial No. 657,036

1 Claim. (Cl. 88—81)

My invention relates to novel apparatus for illuminating devices and more particularly relates to novel bumpers.

As is well known, the small red stop light used at the rear end of automobiles, particularly trucks, is so small and throws such a small amount of light that it ordinarily is not discernable more than a very short distance away.

What is more serious, however, is the fact that the small stop-light positioned indiscriminately along the back of the automobile gives no indication of the width of the car, so that the operator of a car approaching from the rear cannot tell whether he is approaching a passenger car of the well-known width or possibly a much wider bus or truck.

It is also a well-known fact that many of the accidents which occur at cross-roads are due to the absence of any illumination on the side of the automobile so that the operator of a car approaching from the side does not see the obstacle. Not only is this difficulty experienced on cross-roads, but also along the road when the vehicle ahead attempts to make a complete turn on the road so that its sides face up and down the street when it is turning around.

In fact, the present method of illuminating an automobile has an element of danger in it, in that it depends upon the battery supply in the automobile for its illumination. Should anything happen to that supply and the lighting system become temporarily disrupted, the operator of the vehicle has a choice of coming to an immediate stop which may happen to be at some deserted point to attempt a repair of the damage, or of travelling along the road and endangering himself or passing vehicles. Neither alternative is desirable, and both involve considerable danger.

Furthermore, in parking automobiles, the motorist usually prefers not to use parking lights as this draws heavily on his battery supply. And should he park his car for any considerable length of time his battery may burn down sufficiently to make starting difficult.

The use of glass members having a plurality of facets for reflecting light has been proposed, but as heretofore used, these could not safely be used for illuminating a car because of their fragile character.

Accordingly, I have as the main object of my invention, the provision of a novel bumper.

There are other objects of my invention which, together with the foregoing will appear in a detailed description of the invention in connection with the drawing, in which:

A form of my bumper construction is shown in Figures 1 and 2. As here shown, the bumper 35 is provided with a series of indentations 36 extending along the bumper, as shown in Figure 2. In each indentation, an opening is provided of sufficient diameter to receive the screw portion of a reflector 37 held in place by means of the wing nut 38 in a manner now well understood. A spring 39 is inserted between the base of the reflector and the bumper to protect the reflector from any shocks transmitted through the bumper. As shown, each indentation is of sufficient depth so that the outer edge of the reflector is still within the outer edge of the bumper. The sides 41 of the indentation are of sufficient curvature so that a maximum amount of light coming from the sides will impinge on the facets of the reflector for illuminating purposes.

Although I have illustrated my invention by showing a specific form thereof, it will be obvious that it may take other forms than that herein illustrated, and I do not intend to be limited thereby except as set forth by the appended claim.

I claim:

In an automobile, a bumper having a plurality of indentations and a plurality of reflectors; means for mounting said reflectors in said indentations at a depth at which said reflectors lie entirely within the indentations whereby they are protected from contact with an external body colliding with said bumper; said means comprising screw members secured to each of said reflectors and extending through individual openings in said bumper; and nuts individual to and mounted on the ends of said screw members protruding from the opposite side of said bumper; shock absorber means interposed between said bumper and said reflectors comprising individual springs interposed between said bumper and said reflectors; said reflectors being provided with a plurality of facets for reflecting the light impinging thereon back to the source of said light; the sides of said indentations sloping to form a relatively wide field of reflection for said reflectors.

SOLOMON SHAPERA.